June 4, 1963  T. W. AIKEN, JR  3,091,905
SAFETY POWER BRUSH TYPE LAWNMOWER
Filed Feb. 5, 1962  2 Sheets-Sheet 1
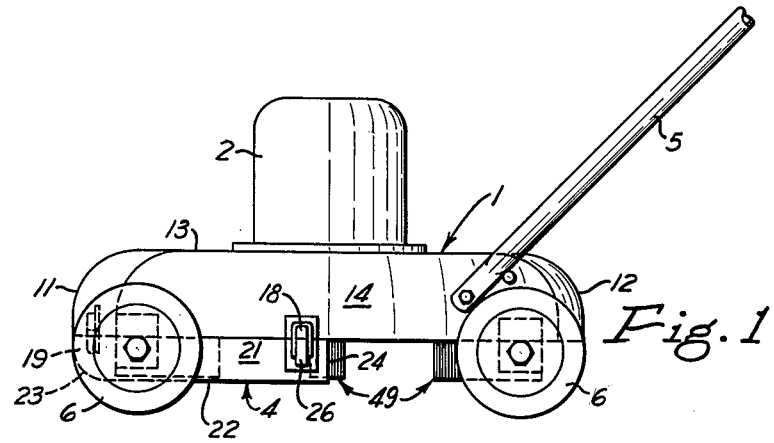
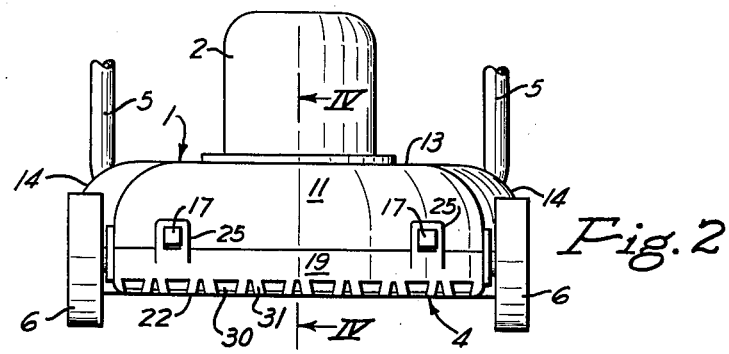
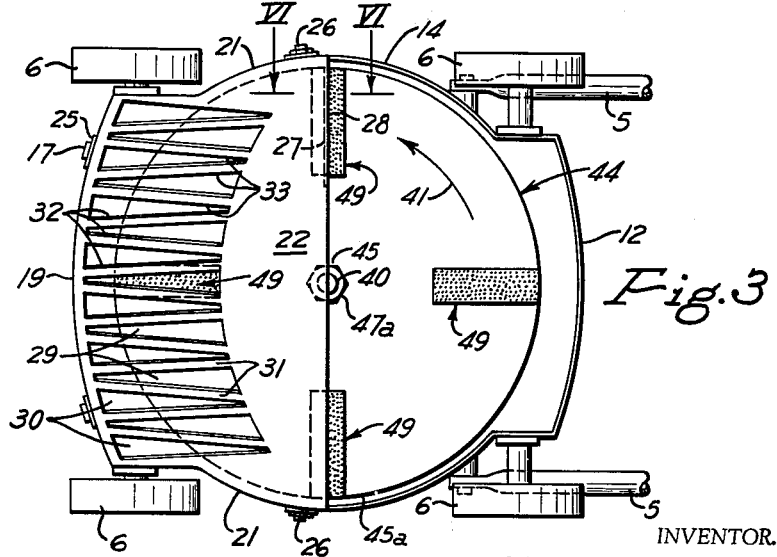
INVENTOR.
THOMAS W. AIKEN, JR.
BY
Robert Bennett Lubic
ATTORNEY June 4, 1963     T. W. AIKEN, JR     3,091,905
SAFETY POWER BRUSH TYPE LAWNMOWER
Filed Feb. 5, 1962     2 Sheets-Sheet 2
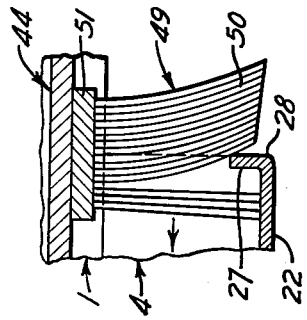
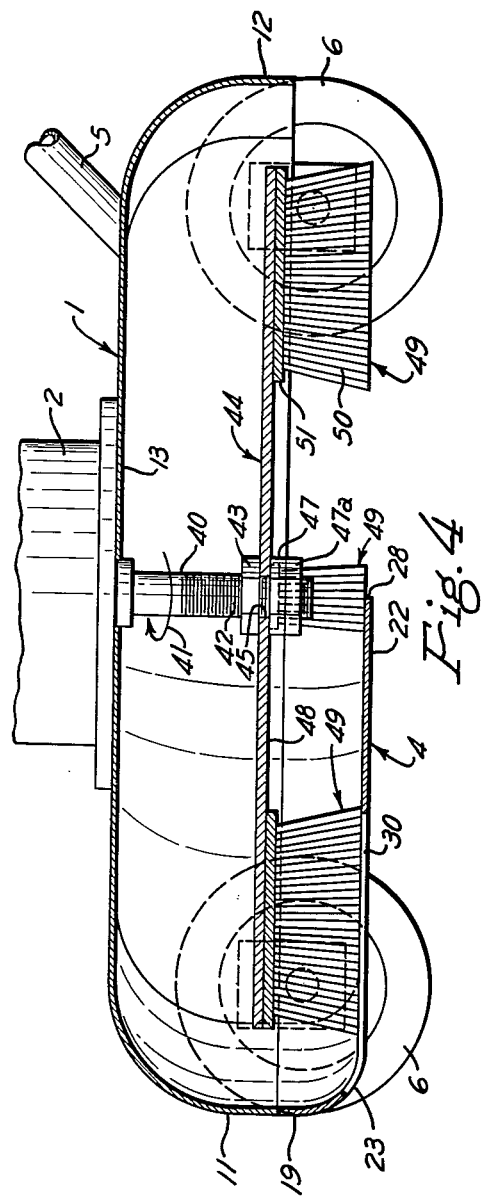
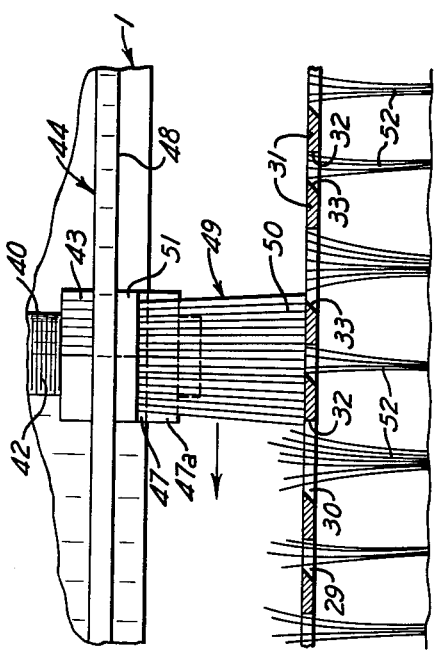
INVENTOR.
THOMAS W. AIKEN, JR.
BY
Robert Bennett Lubic
ATTORNEY 3,091,905
SAFETY POWER BRUSH TYPE LAWNMOWER
Thomas W. Aiken, Jr., 120 Ohio Ave., Glassport, Pa.
Filed Feb. 5, 1962, Ser. No. 171,316
8 Claims. (Cl. 56—25.4)

My invention relates to a safety power lawnmower and, more specifically, a lawnmower utilizing rotating brushes in conjunction with a stationary cutting device.

Initially lawnmowers of the power type were equipped merely with rotating or moveable cutters which provided little or no protection to the operator in the event that the lawnmower should upend or otherwise get out of control of the user. This, of course, resulted in many serious injuries. Subsequently steps were taken to provide guards on the sides and bottoms of the various mowers in order to protect the user and others in the immediate vicinity. These guards, usually in the form of grates, still do not provide the ultimate in safety features. Serious injury can readily be caused by the accidental insertion of any portion of the body through the openings in or around the guard or by the detachment of the guard from the lawnmower through inadvertence or collision. The subject invention overcomes these difficulties by substituting rotating brushes in combination with a series of stationary cutting blades in place of the still lethal rotary cutters. Furthermore, because of the flexibility of the brushes, they will not have the tendency to hurl any hard object that they come into contact with as rotary cutting blades will do. This is an additional safety feature.

In addition to providing the ultimate in safety features, the subject invention is an improvement over its forerunners due to its simplified operation and facility of repairs or dismantling. An added feature is the ease with which the owner may sharpen the stationary cutting blades as opposed to the precision required in the sharpening of the older rotary cutting blades so as not to throw the rotation out of balance.

Other details, objects and advantages of the subject invention will become apparent as the following detailed description of a present preferred embodiment thereof proceeds.

In the accompanying drawings are illustrated a present preferred embodiment of the subject invention in which—

FIGURE 1 is a side elevational view of a lawnmower constructed in accordance herewith.

FIGURE 2 is a front elevational view of the lawnmower shown in FIGURE 1.

FIGURE 3 is a bottom plan view of the lawnmower shown in FIGURE 1.

FIGURE 4 is an enlarged sectional view taken on line IV—IV of FIGURE 2.

FIGURE 5 is an enlarged fragmentary sectional view showing one of the brushes sweeping grass against the stationary cutter blades in accordance with the construction provided hereby.

FIGURE 6 is an enlarged fragmentary sectional view taken on line VI—VI of FIGURE 3, and showing one of the brushes contacting the brush cleaner in accordance herewith.

The subject invention, a safety power lawnmower, broadly comprises, referring now to FIGURE 1, a housing member 1, a power means 2, an undercarriage 4, an operational handle 5 and four moveable wheels 6.

The housing member 1, referring now to FIGURES 1 and 2, is an inverted U-shape in cross section with vertical front 11 and rear 12 walls, a horizontal top wall 13 and two convex side walls 14. Mounted upon the top wall 13 of the housing member is the power means 2, and attached at the front and rear of both of the housing members' sidewalls 14 are the moveable wheels 6. Connected to the rear of each of the housing member's side walls 14 is the operational handle 5. Two lugs 17 are horizontally projected from the housing member's front wall 11. A lug 18 is similarly disposed from the center of each of the housing member's side walls 14.

The undercarriage 4 is U-shaped in cross section and extends on a parallel to the housing member 1, halfway along the underside thereof from the front to the middle of same. The undercarriage 4 contains a vertical front wall 19, two vertical side walls 21, and a horizontal bottom wall 22 (FIGURES 3 and 4) which merges into the front wall via a gradual slope 23. The undercarriage 4 is open at its rear 24. Two vertical latch bars 25 (FIGURE 2) with upper end openings are upwardly disposed from the undercarriage's front wall 19 for the purpose of fastening respectively around the two lugs 17 projecting from the housing member's front wall 11. A latch bar 26 (FIGURE 1) is similarly disposed from each of the undercarriage's side walls 21 for the purpose of fastening to the housing member's side wall lugs 18. When all of said latch bars 25, 26 are firmly secured, to their respective lugs 17, 18 the housing member 1 and undercarriage 4 should lie in substantially parallel planes. A rectangular upright 27 referring now to FIGURE 6, is vertically mounted on the left rear 28 of the undercarriage's bottom wall 22 and perpendicular thereto.

The gradual slope, referring now to FIGURE 3, merging the front 19 and bottom 22 wall of the undercarriage 4 comprises a grille-like series of V-shaped 29 and inverted V-shaped 30 openings, in alternate sequence, separated by a series of narrow strips 31 which act collectively as a safety or protective guard and individually as stationary cutting blades. The counterclockwise sides 32 of said blades are sharpened into cutting edges and the clockwise sides 33 constructed as trailing edges.

A rotary shaft 40 (FIGURE 4) cylindrical in shape, is vertically suspended from the power means 2 through the center of the housing member's top wall 13 to a point just below the plane upon which the housing member and undercarriage join. The rotary shaft 40 is adapted to rotate in a clockwise direction 41 in response to power submitted thereto from the power means 2. The lower portion of the shaft is spirally threaded 42 and adapted to receiving in the following sequence, an upper locknut 43, a horizontally disposed disc 44 with a threaded center opening 45 and two lower adjustable locknuts 47, 47a. The lower adjustable locknuts 47, 47a are adapted, in conjunction with the upper locknut 43, to securing the disc 44 in a firm perpendicular position against the shaft 40 in order that it may receive and respond to any power transmitted thereto by said shaft.

Perpendicularly positioned in relation to the disc 44 and suspended from the underside 48 thereof are four vertically disposed brushes 49 equally spaced, ninety degrees apart (FIGURE 3), and extending from the circumference 45a of said disc halfway towards the center 45 thereof. The bristles 50 of these brushes 49 (FIGURE 4) are of a fairly stiff consistency and vertically disposed from their base 51 to a plane adjacent to the bottom wall 22 of the undercarriage 4.

When power is transmitted through the shaft 40 to the disc 44, the brushes 49 are caused to rotate horizontally in a clockwise direction so as to sweep any and all grass and other vegetation 52 (FIGURE 5) protruding upwardly into the undercarriage through its grille-like openings 29 and 30, diagonally against the cutting edges 32 of the stationary blades 31 without possibility of danger to the operator or other persons in the event of a mishap. As the brushes continue to rotate past the grille-like openings 29 and 30, that portion of the severed grass and other vegetation 52 which has not fallen to the ground through the grille or been brushed out of the rear 24 of the undercarriage but continues to cling to the brushes 49, will be swept against the upright 27 at the rear of the undercarriage which acts as a brush cleaner and prevents those severed grasses from continuing to cling to the brushes 49 as said brushes re-enter the undercarriage 4 on their rotating path (FIGURE 6).

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior act.

Having disclosed my invention, I desire to claim it as follows:

1. A safety power lawnmower adapted to be moved over a surface having vegetation growing thereon to cut such vegetation, said lawnmower comprising in combination:
   (a) housing means defining a hollow enclosure;
   (b) ground engaging wheel means mounting said housing for movement over the surface with the bottom of said enclosure disposed in spaced relation to said surface;
   (c) handle means projecting from said housing means to enable a user to push said housing means over the surface;
   (d) grille means having openings therein and forming at least a portion of the bottom of said enclosure, said grille means being secured to said housing, whereby at least a part of the vegetation to be cut enters and projects through said openings;
   (e) one edge portion of at least some of said openings being a cutting edge;
   (f) a plurality of brush means;
   (g) support means for rotatably mounting said brush means within said enclosure for brushing engagement with the cutting edges of said openings;
   (h) power means for drivingly rotating said brush means within said enclosure whereby said brush means successively engage said cutting edges of said openings and cut the vegetation projecting therethrough; and,
   (i) means carried within said enclosure and disposed in the path of movement of said brush means for dislodging from said brush means vegetation carried thereby.

2. A safety power lawnmower as defined in claim 1 wherein said housing means comprises a top hollow housing member, and a bottom housing member detachably secured under said top housing member, said bottom housing member having said grille means forming a part thereof.

3. A safety power lawnmower as defined in claim 1 wherein said grille means includes a plurality of triangular openings, positioned with the smallest angle of each opening disposed adjacent the largest angle of the adjacent opening.

4. A safety power lawnmower as defined in claim 1 wherein said support means comprises a horizontally disposed plate member having said brush means secured in depending relation thereof, and a vertically disposed shaft journaled in said housing means and carrying said plate member thereon.

5. A safety power lawnmower as defined in claim 1 wherein said housing means comprises a top hollow housing member, and a bottom housing member detachably secured under said top housing member, said bottom housing member having said grille means forming a part thereof, said grille means includes a plurality of triangular openings, positioned with the smallest angle of each opening disposed adjacent the largest angle of the adjacent opening, said support means comprises a horizontally disposed plate member having said brush means secured in depending relation thereto, and a vertically disposed shaft journaled in said housing means and carrying said plate member thereon, and said power means is carried on said top hollow housing member and is drivingly associated with said shaft.

6. A safety power lawnmower adapted to be moved over a surface having vegetation growing thereon to cut such vegetation, said lawnmower comprising in combination:
   (a) housing means defining a hollow enclosure;
   (b) ground engaging wheel means mounting said housing for movement over the surface, with the bottom of said enclosure disposed in spaced relation to said surface;
   (c) grille means having openings therein and forming at least a portion of the bottom of said enclosure, said grille means being secured to said housing whereby at least a part of the vegetation to be cut enters and projects through said openings;
   (d) one edge portion of at least some of said openings being a cutting edge;
   (e) at least one brush means;
   (f) support means for rotatably mounting said brush means within said enclosure for brushing engagement with the cutting edges of said openings; and
   (g) power means for drivingly rotating said brush means within said enclosure whereby said brush means successively engage said cutting edges of said openings and cut the vegetation projecting therethrough.

7. A safety power lawnmower as defined in claim 6 wherein said housing means includes a bottom wall partially covering the bottom thereof, said grille means forming part of said bottom wall, and further including a flange projecting upwardly of said bottom wall, said flange being disposed in the path of movement of said brush means for dislodging from said brush means vegetation carried thereby.

8. A safety power lawnmower adapted to be moved over a surface having vegetation growing thereon to cut such vegetation, said lawnmower comprising in combination:
   (a) housing means defining a hollow enclosure with a bottom wall partially covering the bottom of said enclosure;
   (b) ground engaging wheel means mounting said housing for movement over the surface, with the bottom wall of said enclosure disposed in spaced relation to said surface;
   (c) handle means projecting from said housing means to enable a user to push said housing means over the surface;
   (d) grille means having openings therein and forming at least a portion of said bottom wall, said grille means being disposed such that at least a part of the vegetation to be cut enters and projects through said openings;
   (e) at least one edge portion of each of said openings being a cutting edge;

(f) a plurality of brush means;
(g) support means for rotatably mounting said brush means within said enclosure for brushing engagement with said cutting edge of said openings;
(h) power means for drivingly rotating said brush means within said enclosure whereby said brush means successively engage said cutting edges of said openings and cut the vegetation projecting therethrough; and,
(i) means projecting upwardly from said bottom wall in the path of movement of said brush means for dislodging from said brush means vegetation carried thereby.

References Cited in the file of this patent
UNITED STATES PATENTS

| | | |
|---|---|---|
| 1,890,811 | Gast | Dec. 13, 1932 |
| 2,547,328 | Koch et al. | Apr. 3, 1951 |
| 2,777,270 | Colclazier | Jan. 15, 1957 |